Nov. 7, 1939.	J. SIVERTSEN	2,179,058
VARIABLE INDUCTANCE DEVICE
Filed March 27, 1936	2 Sheets-Sheet 1
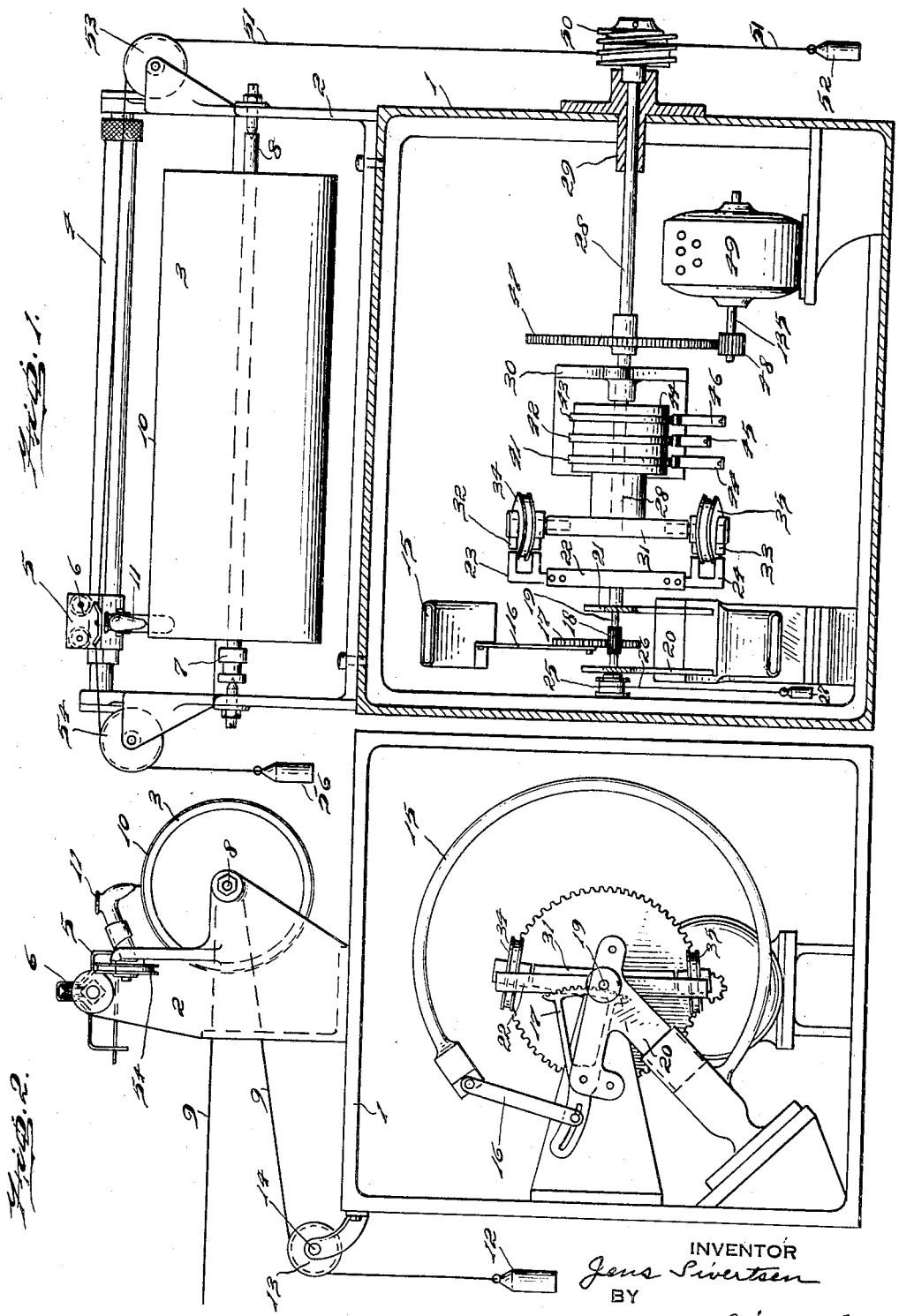
INVENTOR
Jens Sivertsen
BY
Herbert P. Fairbanks
ATTORNEY Nov. 7, 1939.                J. SIVERTSEN                    2,179,058
                      VARIABLE INDUCTANCE DEVICE
                       Filed March 27, 1936          2 Sheets-Sheet 2
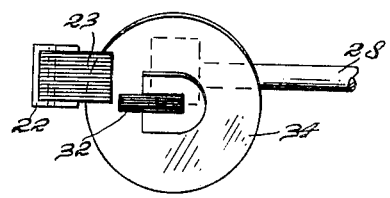
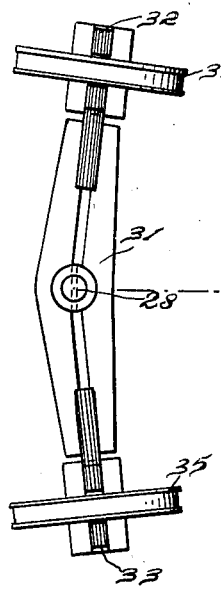 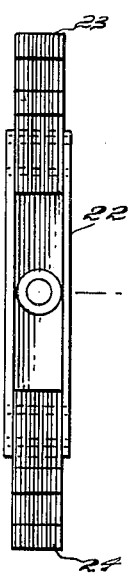 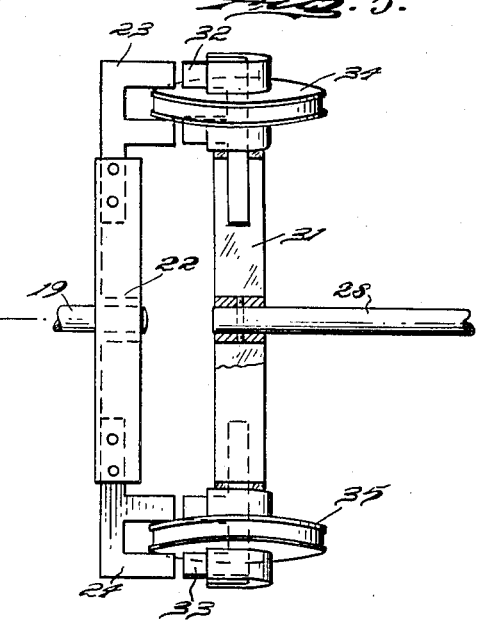
INVENTOR
Jens Sivertsen
BY
Herbert S. Fairbanks
ATTORNEY Patented Nov. 7, 1939

2,179,058

UNITED STATES PATENT OFFICE 2,179,058

VARIABLE INDUCTANCE DEVICE

Jens Sivertsen, Philadelphia, Pa., assignor to Tinius Olsen Testing Machine Company, Philadelphia, Pa., a corporation of Pennsylvania Application March 27, 1936, Serial No. 71,161

2 Claims. (Cl. 171—119)

My present invention relates to a novel hydraulic gauge pressure recorder which records the pressure from hydraulic gauges, and, more particularly, to those of the type used for testing the strength of materials.

The hydraulic weighing in a testing machine of the strain on a specimen is accomplished by having the strain on the specimen affect a fluid, usually oil, in a chamber.

If F is the total strain on the specimen, A the area on which F acts, and P the applied pressure, then F equals PA. A pressure gauge measuring the pressure P can therefore, when the area A is constant, be calibrated in terms of F, for example in pounds, kilograms or tons. It is desirable to have an automatic recording device to indicate and record the stress-strain diagram of the material.

The power available in the gauge is so small that it cannot directly drive any drum or pen arrangement.

To obtain any real accuracy, it has been necessary to provide the gauge with contacts for closing an electric circuit to actuate a motor, which, in turn, drives the recording drum, and read justs a contact.

The objection to this method is that there still remains some physical connection between the sensitive element and the recording device, which causes friction. These gauges are often provided with jewel bearings to reduce the friction, and, if the friction can be eliminated or further reduced, a more accurate reading can be obtained. A further disadvantage was the necessity of cleaning the contacts of the sensitive element.

In my present invention, there is no physical connection between the sensitive gauge, illustrated as a Bourdon tube, and the recording device, so that the accuracy of the readings is materially increased.

With the foregoing and other objects in view as will hereinafter clearly appear, my invention comprehends a novel hydraulic gauge pressure recorder.

It further comprehends a novel construction and arrangement of an electrical pick up and novel means for controlling and for amplifying it.

It further comprehends a novel position control in which the parts do not have any mechanical connection, and wherein an electric circuit when unbalanced by the angular movement of a sensitive element can have its balance restored.

Other novel features of construction and advantage will hereinafter clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only, and that the various instrumentalities, of which my invention consists, can be variously arranged and organized, and the invention is not limited to the precise arrangement and organization of these instrumentalities as herein set forth.

Figure 1 is a sectional elevation of an hydraulic gauge pressure recorder, embodying my invention.

Figure 2 is an end elevation with a cover plate removed.

Figure 3 is an end elevation of a pick up member and its adjuncts.

Figure 4 is an elevation of a second pick up member.

Figure 5 is a front elevation of the electrical pick up.

Figure 6 is a top plan view of the upper portion of the construction seen in Figure 5.

Similar numerals of reference indicate corresponding parts.

Referring to the drawings:

1 designates a housing or framework within which the working parts are mounted. 2 designates brackets which carry the drum 3 and the pen holder guide 4 which is in the form of a square rod. 5 is the pen holder which travels by means of rollers 6 on an edge of the rod 4 in a direction parallel to the axis of the drum. 7 is a pulley fixed to the drum shaft 8. A cord 9 passes around the pulley and rotates the pulley when one end of the cord is affected by stress or compression of the specimen.

The drum may also be affected in any other way known in this art in which the angular rotation is proportional to the stress.

The graph paper 10 is wrapped around the drum.

When the drum rotates, proportionally to the stress, the pen holder 5 and pen 11 move parallel to the axis of the drum proportionally to the strain, and a graph is recorded on the paper 10, indicative of the properties of the specimen under test. The cord 9 has at one end a weight 12 and passes over a pulley 13 mounted in a bracket 14. 15 is a pressure gauge, illustrated as a Bourdon tube, to which the pressure is conducted from the testing machine in the conventional manner. One end of the gauge is connected by a link 16 with a gear segment 17 which rotates a gear 18 fixed to a shaft 19 supported in bearings in the brackets 20 and 21.

22 designates a member rigidly secured to the shaft 19. Stacks of laminations 23 and 24 are fixed in each end of the member 22 to project laterally from one side thereof.

It will thus be apparent that when the gear 18 and shaft 19 are rotated by distortion of the Bourdon tube 15, the member 22 and its laminations 23 and 24 will be rotated.

The shaft 19 has a pulley 25 fixedly secured to it, and a silk string 26 is wound around the pulley and connected with a weight 27. The purpose of this is to keep the teeth of the gear 18 constantly pressed in the same direction against the teeth of the gear 17, thereby overcoming any lost motion in such gearing.

The shaft 19 is in axial alignment with a shaft 28 journalled in a bearing 29 and a bracket 30. A member 31 is fixed to the shaft 28 at the end nearest to the Bourdon tube.

The ends of the member 31 have stacks of laminations 32 and 33 secured to them of the same kind as the laminations 23 and 24 on the member 22 but of fewer number so that they are of less width.

It will be clear from Figures 3, 4 and 6 that these laminations are not diametrically opposite each other, but are offset from the diametrical line one half the width of each of the laminations 23 and 24. The laminations 32 and 33 are the same distance as the laminations 23 and 24 from the center line of the shaft 28. A coil 34 is fixed to the lamination 32 and a coil 35 is fixed to the lamination 33.

The coils are adapted to be connected by conductors to the conducting rings 41, 42 and 43, supported on an insulating cylinder 159, supported on the shaft 28 and rotating with it. The rings 41, 42 and 43 are contacted by flat springs 44, 45 and 46 provided with silver contacts. The shaft 28 is intergeared by gears 47 and 48 with the shaft of an electric motor 49.

The shaft 28 has a pulley 50 of special construction fixed to it, and a cord 51 passes around such pulley and is connected with a weight 52. The cord 51 is attached to the pen holder 5, passes over pulleys 53 and 54 and has its end attached to a weight 56. The pen holder will, therefore, move when pulley 50 is rotated.

The weights 52 and 56 keep the cord 51 taut at all times so that no slippage occurs. The pen holder will move a distance proportional to the unwound surface of the pulley 50.

When the Bourdon tube 15, which is connected in the usual manner to the hydraulic loading system, is distorted by the internal pressure, the shaft 19 and member 22 rotate. This produces a change in the air gap between laminations 23 and 32 and also between laminations 24 and 33. This change of air gap creates an unbalanced electrical condition which results in an A. C. voltage, which is amplified in any desired manner. This voltage operates relays or their equivalent and the motor to cause the motor to revolve in a direction to restore the air gaps to their former values.

In order to obtain this result, the member 31 will have to rotate exactly the same angle as the member 22 was rotated by the gauge or tube 15. The pulley 50 on shaft 28 was rotated sychronously, winding up the cord 51 an amount equal to the surface integral $\int \rho\, d\alpha$ of the rotated angle, where $\alpha$ (alpha) is the total angle rotated, $d\alpha$ is the differential of $\alpha$, $\rho$ (rho) is the varying radius along the surface of the pulley and $\int$ is the integral sign. There is a special reason for this varying radius. A Bourdon tube does not have a linear scale, that is to say absolute proportionality does not exist between the load on the tube and the rotation of the shaft 19. The graph paper, however, around the drum 3 requires a linear scale. This is obtained by making the pulley of a form which is different from a circle. The shaft 19, shaft 28 and pulley 50 may rotate more than one turn. This means that the pulley 50 according to the calibration may be required to have a different diameter at the same point on the surface. To provide for this, the pulley has a helical or screw-like groove to receive the cord 51.

It is sometimes necessary for the recorder to have different ranges, or, in other words, the total travel of the graph may sometimes require a smaller deformation of the tube 15, and a smaller rotation of shafts 19 and 28 and pulley 50. This can be done by having different pulleys 50 each having its special range by being cut or grooved to a special shape for its particular range.

The electro-mechanical system is such that without any mechanical connection, the shaft 28 follows the shaft 19. The laminations 23 and 32 are on the same diameter and match each other, and the same holds true of the laminations 24 and 33. When, therefore, the member 22 rotates a small angle, one of the laminations 32 and 33 is more covered than the other by its cooperating lamination. The laminations 23 and 32, together with the coil 34, constitute an inductance, and, in a similar manner, the laminations 24 and 33 and the coil 35 constitute a second inductance. When the shaft 19 rotates member 22, thereby moving the laminations 23 and 24, one of these inductances becomes greater than the other, since they were originally adjusted to be equal.

The operation of my novel hydraulic gauge pressure recorder will now be apparent to those skilled in this art and is as follows:

The testing machine is loaded, and the pressure passes in the conventional manner into the Bourdon tube 15, which tends to straighten out due to the internal pressure, thereby effecting a partial rotation of the shaft 19. The member 22 with its laminations will move counterclockwise a small angle, see Figure 2. The laminations 32 will now be more covered by the laminations 23, and the laminations 24 will move away from the laminations 33. This increases the inductance of coil 34, and decreases the inductance of coil 35, so that a voltage is set up.

This voltage is utilized to unbalance an electrical network to drive the motor in a clockwise direction and thereby shaft 28, member 31 and laminations 32 and 33 in a counter-clockwise direction. The air gap between laminations 22 and 32 is thereby increased to its former value and the air gap between laminations 24 and 33 is decreased to its former value so that the unbalance in the electrical net-work disappears.

The novel pick-up shown in Figures 3, 4, 5 and 6 has, however, distinct advantages, both in regard to ease of manufacture and electrical characteristics, as it can be made at low impedance, and, therefore has a low noise pick-up.

It will now be apparent that I have devised a new and useful hydraulic gauge pressure recorder which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent is:

1. A control, comprising a prime mover, a shaft turned thereby, a bar having its central portion fixed to said shaft, stacks of laminations fixed to opposite ends of said bar, and in line with a line through and normal to the axis of rotation of said bar, a second shaft in alignment with said first shaft but having no mechanical driving connection therewith, a second bar centrally connected with said second shaft, stacks of laminations fixed to opposite ends of said second bar and offset with respect to a line through and normal to the axis of rotation of said second bar and partly in registry with the first stacks of laminations, and coils fixed to the second stacks of laminations whereby when the prime mover turns its shaft the inductance in one coil will increase and in the other coil will decrease.

2. A control, comprising a prime mover, a shaft turned thereby, a bar having its central portion fixed to said shaft, stacks of laminations fixed to opposite ends of said bar, and in line with a line through and normal to the axis of rotation of said bar, a second shaft in alignment with said first shaft but having no mechanical driving connection therewith, a second bar centrally connected with said second shaft, stacks of laminations fixed to opposite ends of said second bar and offset with respect to a line through and normal to the axis of rotation of said second bar and partly in registry with the first stacks of laminations, the stacks of laminations at the ends of one bar having a different number of laminations than the number of laminations in the stacks of laminations at the ends of the other bar, and coils fixed to the second stacks of laminations whereby when the prime mover turns its shaft the inductance in one coil will increase and in the other coil will decrease.

JENS SIVERTSEN.